No. 889,350. PATENTED JUNE 2, 1908.
O. ANDERSON.
CREAM SEPARATOR.
APPLICATION FILED FEB. 1, 1904.
3 SHEETS—SHEET 1.
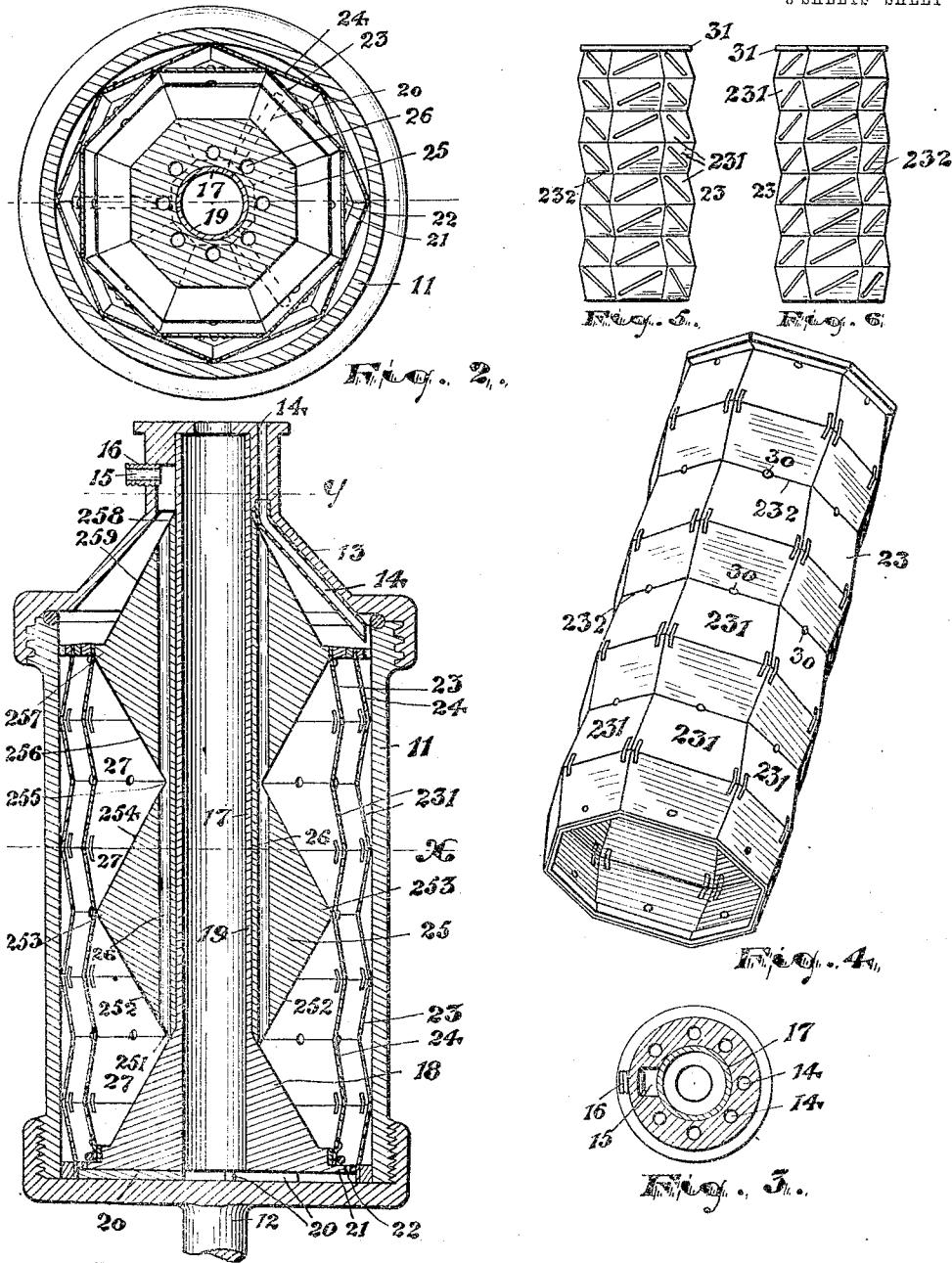

No. 889,350. PATENTED JUNE 2, 1908.
O. ANDERSON.
CREAM SEPARATOR.
APPLICATION FILED FEB. 1, 1904.

3 SHEETS—SHEET 2.

WITNESSES:
Ralph Lancaster.
Russell M. Everett

INVENTOR.
Oscar Anderson,
BY
Charles H. Pell
ATTORNEY

No. 889,350.  
PATENTED JUNE 2, 1908.  
O. ANDERSON.  
CREAM SEPARATOR.  
APPLICATION FILED FEB. 1, 1904.
3 SHEETS—SHEET 3.
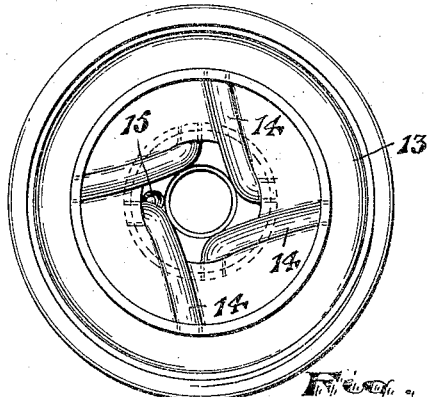
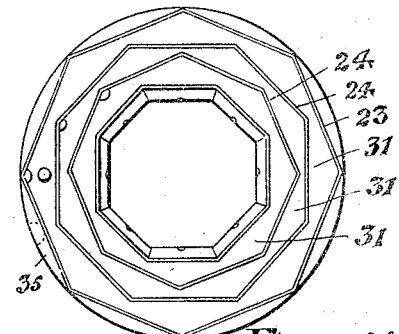
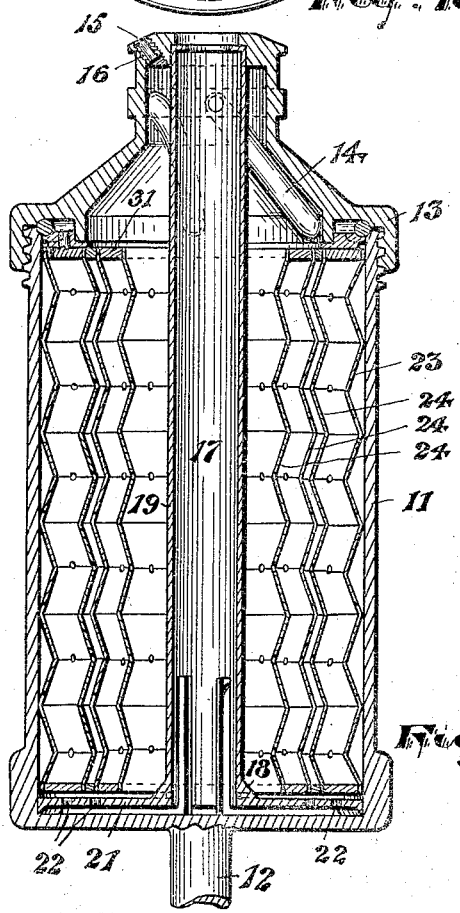
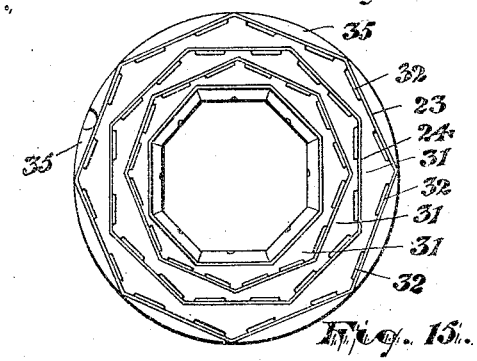
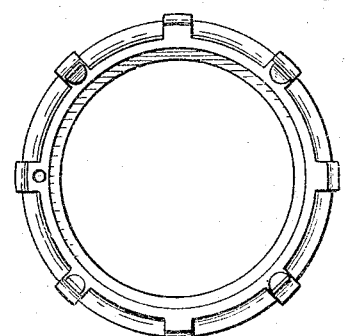
WITNESSES:  
Ralph Lancaster  
Russell M. Everett
INVENTOR  
Oscar Anderson,  
BY  
Charles H. Pell  
ATTORNEY

UNITED STATES PATENT OFFICE.

OSCAR ANDERSON, OF ARLINGTON, NEW JERSEY, ASSIGNOR TO NATIONAL DAIRY MACHINE COMPANY, OF NEWARK, NEW JERSEY, A CORPORATION OF NEW JERSEY.

CREAM-SEPARATOR.

No. 889,350.   Specification of Letters Patent.   Patented June 2, 1908.

Application filed February 1, 1904. Serial No. 191,467.

*To all whom it may concern:*

Be it known that I, OSCAR ANDERSON, a citizen of the United States, residing at Arlington, in the county of Hudson and State of New Jersey, have invented and produced a new and original Improvement in Cream-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of centrifugal cream separators represented by the one shown in my prior patent dated February 16, 1897, No. 576,994, the objects of the present improvements being to secure greater efficiency in the separation of the cream from the whole milk; to increase the skimming capacity of the machine; to avoid the accumulation of cream at points within the said machine, and to prevent the cream from being acted on unduly by the centrifugal force and injured for certain purposes; to avoid the butter fat globules from being broken and thus giving the cream an oily appearance, rendering it unsuitable for certain confectioner's uses, ice cream, etc., and to secure other advantages and results, some of which may be referred to hereinafter in connection with the description of the working parts.

The invention consists in the improved centrifugal creamer, and in the arrangements and combinations of parts of the same, all substantially as will be hereinafter set forth and finally embraced in the clauses of the claim.

Figure 11:
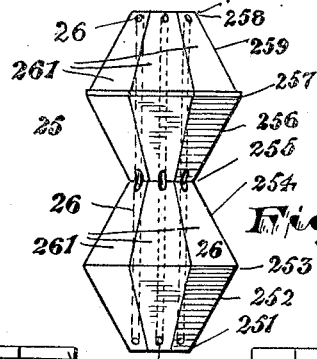
Figure 7:
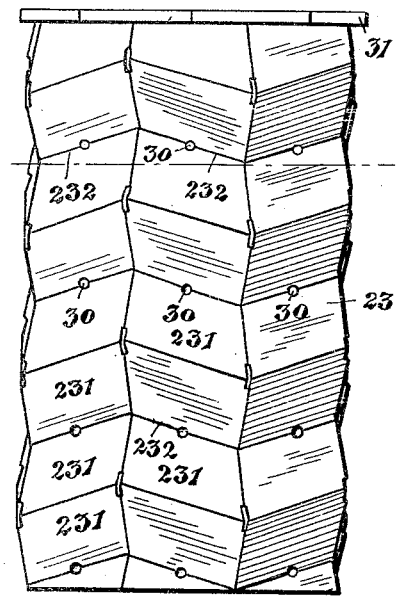
Figure 8:
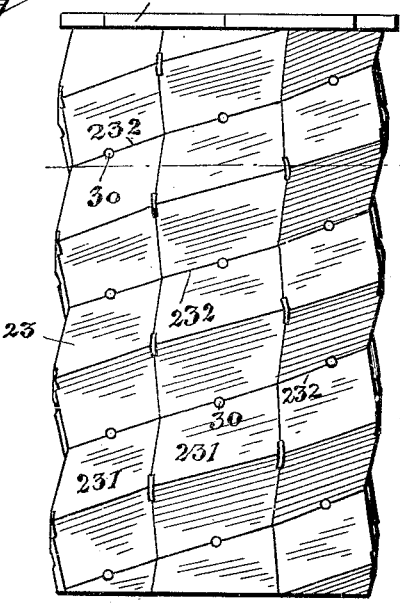
Figure 9:
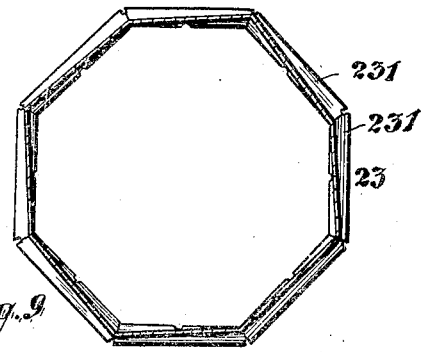
Figure 10:
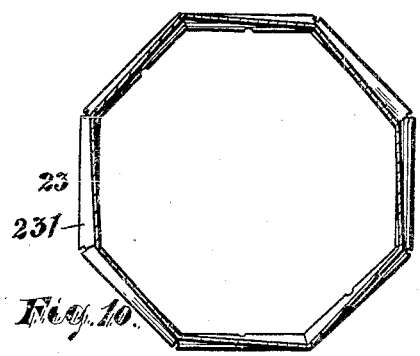

Referring to the accompanying drawings, in which like letters of reference indicate corresponding parts in each of the several figures, Figure 1 is a vertical section of a separating bowl and its contents, showing the relations of the several parts; Fig. 2 is a horizontal section of the same taken on line $x$; Fig. 3 is a section taken on line $y$, of Fig. 1; and Fig. 4 is a detail perspective view of a liner showing a preferred construction; Figs. 5 and 6 are side elevations on a reduced scale showing modifications in the detail construction of the liners; Figs. 7 and 8 are elevations showing further modifications in the construction of the liners, and Figs. 9 and 10 are sections taken horizontally through Figs. 7 and 8. Fig. 11 is a detail side view of what I may term the inner filler; Fig. 12 is a sectional view showing a modification of construction; Fig. 13 shows the underside of the cap or cover of the bowl, Figs. 14 and 15 are, respectively, bottom and top views of the liners as arranged in Fig. 12; Fig. 16 is a plan of an upper ring in connection with the packing ring for imperviously closing the joint at the edge of the cover, and Fig. 17 is an edge view of the last said ring.

In said drawings, 11 indicates a bowl arranged upon a vertical shaft 12, in any manner common in this art, the said shaft being rotated at a high rate of speed by any suitable motive mechanism (not shown). The said bowl 11, is provided with a cover 13, which may be screwed or otherwise imperviously seated upon the open top of said bowl. The said cover is provided with blue milk outlets 14, and cream outlets 15, the outflowing of the cream being regulated and controlled by a suitable cream screw 16, of any usual construction. Within the said bowl is arranged, concentric with the vertical axes thereof, a whole milk feeding tube 17. This said tube is preferably cast in one solid piece of aluminum, of which the base is given a conical form as at 18, and above said conical base, said piece is made cylindrical as at 19. The central whole milk passage of the tube extends from the top of said bowl to, or nearly to, the bottom thereof, the under side of the conical part or base 18, being preferably provided with radial ribs 20, adapted to raise the said base or conical part above the bottom or flooring of the bowl to form horizontal passages extending toward the periphery of the said bowl.

Near the periphery, the base of the conical part is flanged as at 21, and the flange thereof is provided with a series of upflow passages 22, communicating with the peripheral parts of the main chamber of the bowl in which the lining partitions 23 and 24 are stationed.

Around the cylindrical extension or portion 19, of the central piece or new milk tube 17, is arranged what I may term an inner filler 25, adapted to occupy, or partly occupy that poriton of the space at the interior of the bowl between the periphery of the central tube 17, and the innermost liners of the series, taking up much of the space at the cream wall portion of the main bowl chamber, where the cream has heretofore stood or only slowly moved upward in the line of the cream exit. The shape of this filler 25, is, as indicated in Figs. 1, 2 and 11, that of a series of oppositely disposed truncated pyramids, the outer sides of said filler being diametrically small or reduced at the lower end thereof, as at 251, then extending outwardly as at 252, to a point or line of engagement 253, with the inside wall of the inner liner, 24, and then contracting on inclined lines 254, to a point or line 255, lying closely near to and around the tube 17, then again expanding on outwardly inclined lines, as at 256, to a point of engagement 257, with the said inner liner at or near the top thereof, and then again contracting as at 259, toward the tube 17, at the top of the bowl, or at the under side of the cover thereof, as at 258, the filler in vertical section approximating in shape a series of diamonds, as shown in Fig. 1, through the longer axis of which series, the whole milk supply tube or passage 17, extends. Cream passages 26, are formed in and extend upward through the filler near the outside of the whole milk supply tube, which cream passages 26, are in open communication with the main interior chamber of the bowl at the contracted parts of the filler, as at 251, 255 and 258, so that the cream within the inwardly contracting chambers 27, hugging the inclined walls 252, 254 256, 259, of the said filler will be conducted to the said vertical cream passages 26, and be forced therethrough with considerable rapidity of movement. Said passages 26, are disposed midway between the lateral edges of the facets 261, of the pyramidal formations. The horizontal edges of the facets at the enlarged parts of the filler, serve as stays for the liners, tending to hold the same in proper operative relation within the bowl.

The liners 23, 24, are of peculiar construction in that the peripheries of the said liners are broken up into a collection of facets 231, the inner lines 232, at the outlines of said facets being all formed to lie inclined to radii of the vertical axis of the bowl, so that the cream will not collect in the angles or inward depressions and stand therein subjected to centrifugal pressure, as they would if curved concentric to said axis, but on the contrary will flow through the perforations 30, at the points in the lines 232, nearest the said axial center of the bowl and thence toward the central cream passages 26. The said liners 23, 24, are angular in horizontal cross section, preferably in the form of octagons, and there are no curved lines concentric with the axis of the bowl therein where the facets meet and at which the cream is liable to collect or stand in the separating operation.

The facets 231, of the angular liners are preferably plain surfaces inclined to the radii of the axis of the bowl and form low protuberances which make the vertical cream passage or chambers at the outer sides of said liners irregular, so that the cream in its upflow movement will be forced into contact with the outer surfaces of said facets being permitted to flow not only vertically but horizontally through the chambers in a spiral course, thereby increasing the distance of movement or passage through the bowl, whereby the said milk will be given greater opportunity for contact with the said liner and deposit its cream therefrom with greater thoroughness and perfection and at a position where the centrifugal force is greatest.

At the top and bottom edges of the liners are formed end flanges 31, which are preferably angular in inner and outer outline, in plan, as in Figs. 15, 16, and at the bottom said flanges may be notched on their inner sides, so as to form slots 32, permitting the new milk to flow upward, very close to the liners to the chambers between said liners. Thus, the new milk is brought in thin and flat streams, against the lining partitions at the beginning of the cream separating operation.

While the polygonal lining partitions are horizontally corrugated on angular lines, as in Figs. 1, 4, 5 and 6, and the milk in its upward course is forced more effectually against the inclined facets, 231, yet, nevertheless, under some conditions the corrugations may be spiral as in Fig. 8, or wavy as in Fig. 7, or otherwise shaped. The outer polygonal liner is also provided with a flange or flanges 35, which conforms to the straight lines of the polygon at the inside, and is curved to conform to the bowl at the outside to hold the liner in shape.

The operation of the bowl and its manner of conducting the milk from the new milk entrance in the cover to the cream and blue milk exits on the same is similar in a broad sense to that commonly employed and specified in the patent above referred to and needs no detail description here.

Having thus described the invention, what I claim as new is:—

1. In a centrifugal creamer, a rotatable bowl provided with a main liquid chamber, means for introducing fluids into one end of the chamber and outlets for separated liquids at the other end of the chamber, and a cream-collecting liner therein consisting of a hollow sleeve having the horizontal cross-section of a convex polygon, said liner comprising a plurality of continuous series of facets, the facets of each series adjacent one another, corresponding facets of adjacent series mechanically united and inclined in opposite directions with respect to the axis of the sleeve, said sleeve having perforations in proximity to the apices of the pyramids formed by said facets and having other perforations in proximity to the centers of the base-lines of said facets.

2. In a centrifugal creamer, a rotatable bowl provided with a main liquid chamber, means for introducing fluids into one end of the chamber and with outlets for separated liquids at the other end of the chamber, a cream-collecting liner, and a filler therein having a plurality of series of facets, the facets of adjacent series inclined oppositely with respect to the axis of the filler, said filler having also a plurality of vertical flow passages leading upward from near the bases of said facets toward the outlet for light liquid.

In testimony, that I claim the foregoing, I have hereunto set my hand this 25th day of January, 1904.

OSCAR ANDERSON.

Witnesses:
CHARLES H. PELL,
RUSSELL M. EVERETT.